United States Patent Office 3,708,313

Patented Jan. 2, 1973

3,708,313

METALIZING COMPOSITIONS

Oliver A. Short, Wilmington, Del., assignor to E. I. du Pont de Nemours and Company, Wilmington, Del.

No Drawing. Division of application Ser. No. 14,631, Feb. 26, 1970, now Patent No. 3,620,713, which is a continuation-in-part of application Ser. No. 756,358, Aug. 30, 1968, now abandoned, which in turn is a continuation-in-part of application Ser. No. 469,858, June 29, 1967, now abandoned. This application May 21, 1971, Ser. No. 145,904

Int. Cl. C09d 5/24

U.S. Cl. 106—1 4 Claims

ABSTRACT OF THE DISCLOSURE

Acid chloride solutions of noble metals are prepared; the metal is precipitated as a metal-ammonia complex and then reduced to yield a relatively coarse noble metal preciptiate powder. Metalization compositions containing the noble metal powders are printed and fired to form various electrical circuit components.

CROSS-REFERENCES TO RELATED APPLICATIONS

This is a division of S.N. 14,631, filed Feb. 26, 1970, now Pat. No. 3,620,713 which is a continuation-in-part of S.N. 756,358, filed Aug. 30, 1968, now abandoned, which is a continuation-in-part of S.N. 469,858, filed June 29, 1967, now abandoned.

BACKGROUND OF THE INVENTION

Commercially available noble metal powders, particularly platinum powders, prepared by conventional precipitation techniques are extremely fine (i.e., 0.001–0.01 microns) and catalytically active. As such, they are not extremly useful for use in printed circuits unless the powders are mixed with other metals or otherwise modified to (1) reduced catalytic activity during early stages of firing when organic vapors are present and (2) to prevent agglomeration of the very fine powders at the high temperatures of firing.

Present platinum powders are commonly made by precipitating and reducing platinum metal from a solution of platinum chloride. Many reducing agents such as ferrous sulfate, formic acid, sodium formate, formaldehyde, hypophosphorus acid and combinations thereof are utilized. Most platinum precipitates have been devised to produce an extremely fine platinum powder with a very large surface area to obtain the maximum catalytic activity. There are many platinum "blacks" available for use in printed circuits as well as for catalysts.

The platinum "black" made specifically for electronic use is precipitated from a strong alkaline suspension of platinum hydroxide with iron sulfate. This platinum powder possesses average particle sizes within the range of 0.01–0.1 micron and has found considerable use in printed circuit conductors when mixed with other metal powders such as palladium, silver, gold and other noble metals. Platinum "black" has also been used alone in the preparation of inks for use as conductors on green ceramic substrates.

The commonly available platinum "blacks" have two very serious disadvantages in present electronic usage. During the early stages of firing, the resins which bond the ceramic particles together in a ceramic substrate (i.e., resin bonded barium titanate) begin to depolymerize and volatilize. The very fine platinum powder acts as an oxidation catalyst for these vapors and creates hot spots inside multi-layer assemblies which result in rapid vapor release, blisters and delaminations of the assemblies. During latter stages of firing, the platinum metal beings to sinter and shrink even though the melting point of the metal is well above the top firing temperature. The usual platinum "blacks" shrink excessively and form tiny islands of metal and discontinuous metal patterns with poor or no conductivity.

As a result of the above-described deficiencies of present platinum powders, a relatively non-active platinum powder is needed. In general a new type of noble metal powder is needed which is fine enough to use in printed circuit inks but still coarse enough to inhibit catalytic activity and to produce a smooth, compact print when fired on a ceramic substrate in the production of printed circuits.

SUMMARY OF THE INVENTION

This invention relates to a highly useful process for preparing noble metal powders which are used in the formulation of metalizing compositions and to pritned circuit components therefrom.

Accordingly, the process of this invention comprises (1) preparing an aqueous noble metal chloride solution, (2) precipitating a noble metal from solution as a noble metal-ammonia complex by adding ammonium hydroxide to the solution until the pH of the solution is in the range of 9–11, and (3) reducing the noble metal-ammonia complex by adding a reducing agent from the group consisting of monohydrazine sulfate, dihydrazine sulfate, hydrazine hydrochloride, hydrazine hydrate and mixtures thereof, to the complex to yield a noble metal powder having an average particle size within the range of 0.5–2 microns.

Metalizing compositions, comprising an inert liquid vehicle having dispersed therein a noble metal powder (produced by the above process) having an average particle size within the range of 0.5–2 microns, are produced. Ceramic substrates having printed and fired thereon the above metalizing compositions are also part of this invention.

In particular, the new platinum powder does not possess the previously described disadvantages of the prior art platinum powders. Consequently, this new platinum powder is useful in the formulation of metalizing compositions for printing electrodes in monolithic capacitors and for use with other organic bonded, unfired ceramic substrates. The new platinum powder may also be used between layers of alumina tape to produce "buried conductors." For the purpose of describing this invention, platinum, the preferred metal, is referred to throughout the specification. However, this is in no way intended to limit the scope of this invention which is applicable to all noble metals, not just platinum. The noble metals include gold, silver, platinum, palladium, ruthenium, rhodium, osmium and iridium.

DESCRIPTION OF THE PREFERRED EMBODIMENTS

More specifically, an acid chloride solution of a noble metal is prepared by dissolving noble metal sponge in a mixture of nitric and hydrochloric acids (aqua regia) and subsequently decomposing the nitric acid by continued boiling and repeated additions of hydrochloric acid. This solution of noble metal chloride is diluted with water to contain any desirable concentration of metal. This diluted solution is made ammoniacal by adding ammonium hydroxide to arrive at a pH of 9–11 (preferably about 10.5), to precipitate the noble metal from solution as a noble metal-ammonia complex. Reduction is then carried out by the addition of a water solution of the specified reducing agent. The powder thus formed is filtered, washed free of ammonium hydroxide and ammonium chloride, and dried.

The noble metal powder precipitate has a surface area as measured by nitrogen or krypton adsorption of about 0.3 square meter/gram in contrast to the usual platinum "blacks" which have a surface area of 30 or more square meters/gram (0.3 square meter/gram is equivalent to 1 micron diameter and 30 square meters/gram is equivalent to 0.01 micron diameter assuming spherical particles). The particle size obtained is in the desired range of 0.5–2 microns. It has been found that other reducing agents and different pH conditions result in much finer particle sizes, approximately 0.01–0.1 micron.

The important process parameters of this invention are the particular chemical reagents utilized (precipitating agent and reducing agent), the pH control of the precipitation step, and the rate at which the precipitation and reduction are performed. While generally speaking, various other hydroxides, such as sodium hydroxide or potassium hydroxide, would precipitate the noble metals from solution, it has been found that ammonium hydroxide is necessary to produce metal particles having the desired particle size. In the reduction step, various other reducing agents such as ferrous sulfate would reduce the platinum. However, it has been found to be critical that only monohydrazine sulfate, dihydrazine sulfate, hydrazine hydrochloride, hydrazine hydrate, and mixtures thereof will produce noble metals having the desired particle size.

One of the most important aspects of this invention is the pH control in the precipitation step. As previously stated, the pH must be within the range of 9–11 at the start of the reduction reaction; a preferred range is pH 10–11. If the pH is dropped to 8.5, little or no precipitate is obtained and, if a precipitate is obtained, the particle sizes are not within the desired range. When the pH is raised above 11, the precipitation and reduction reactions proceed very slowly, if at all, and the yield of noble metal is less than 50% in addition to producing particle sizes not within the desired range. After the reduction step it is also preferable, although not necessary, to add a sufficient quantity of ammonium hydroxide to the solution to return the pH to 10–11. This additional pH adjustment provides adequate settling of the precipitate and eases the decantation and washing procedures.

It is also important to control the rate at which the ammonium hydroxide and the reducing agent are added to the noble metal chloride solution. Care must be taken to rapidly add the ammonium hydroxide and to rapidly add the reducing agent. Generally, there is a measure of control over the particle size of the noble metal; faster addition rates appear to produce coarser particles (in combination with the pH control); slower addition rates produce fine, catalytic powders.

The following examples are given to illustrate in detail the preferred method of preparing noble metal powders in accordance with the teachings of this application; it is pointed out that these details are not to be taken as limitations of this invention.

Example 1

A 300-gram sample of platinum was dissolved in 1,000 ml. aqua regia; the nitric acid was subsequently decomposed by continued boiling and repeated additions of hydrochloric acid. Then 4,000 ml. of water are added to the platinum chloride solution. To this solution, 12,000 ml. of dilute ammonium hydroxide (28%) were added to form yellow precipitate which is a complex platinum ammonium hydroxide. Subsequently, 300 grams of dihydrazine sulfate, which had been previously dissolved in 8,000 ml. water, were added to the precipitate. The yellow precipitate darkened rapidly, and finally the precipitate became gray in color. Then sufficient dilute ammonium hydroxide was added to return the pH to 10.5. The precipitate was filtered, washed free of ammonium hydroxide and ammonium chloride and dried.

The precipitated platinum powder had a surface area of about 0.3 square meter/gram which is equivalent to about 1 micron.

The metalizing compositions of this invention will usually, although not necessarily, be dispersed in an inert vehicle to form a paint or paste for application to ceramic substrates. The proportion of vehicle to metal may vary considerably depending upon the manner in which the paint or paste is to be applied and the kind of vehicle used. Generally, 1–96% by weight of solids (metals, inorganic binder) and 4–99% by weight of vehicle will be used to produce a paint or paste of the desired consistency.

Any liquid, preferably one that is inert towards the metal powder, may be employed as the vehicle. Water or any of various organic liquids, with or without resin binders, thickening and/or stabilizing agents, and/or other common additives may be utilized as the vehicle. Examples of organic liquids that can be used are esters of higher alcohols, for example, the acetates and propionates; the terpenes such as pine oil, alpha- and beta-terpineol and the like; and solutions of resin binders such as the polymethacrylates of lower alcohols, or solutions of ethyl cellulose, and solvents such as pine oil and the monobutyl ether of ethylene glycol monoacetate $$(\text{butyl—O—}CH_2CH_2\text{—}OCOCH_3)$$

A preferred vehicle for use in this invention consists of: hydrogenated rosin, ethyl cellulose, beta-terpineol, and kerosene. Such vheciles are disclosed in Short, U.S. Pat. 3,536,508. Also, any of the other vehicles disclosed in that application may be used. The vehicle may contain or be composed of volatile liquids to promote fast setting after applications; or it may contain waxes, theremoplastic resins or the like materials which are thermofluid so that the vehicle-containing composition may be applied at an elevated temperature to a relatively cold ceramic body upon which the composition sets immediately.

While metalizing compositions which are applied to green (unfired) dielectric substrates customarily consist essentially of metal powder and a vehicle, the metalizing compositions which are applied to pre-fired ceramic substrates usually contain an inorganic binder in addition to the metal powder and inert vehicle. The inorganic binders used in the metalizing compositions of this invention may be composed of any glass or ceramic material which will melt at a temperature lower than the melting point of the metal powder with which it is used and which will adhere well to the substrate onto which the metalizing composition is applied. Any inorganic material which serves to bind the metals to the substrate can be used as the inorganic binder component. The inorganic binder can be any of the glass frits employed in metalizing compositions. Such frits are generally prepared by melting a glass batch composed of the desired metal oxides, or compounds which will produce the glass during melting, and pouring the melt into water. The coarse frit is then milled to a powder of the desired fineness. The patents to Larsen and Short, U.S. Pat. No. 2,822,279, and to Hoffman, U.S. Pat. No. 3,207,706, describe some frit compositions which can be employed either alone or in combination with glass wetting agents, such as bismuth oxide. Typical frit compositions usable as binders in the compositions of this invention include: lead borate, lead silicate, lead borosilicate and sodium-cadmium borosilicate frits.

When inorganic binders are present in the metalizing compositions, the binders should always be present in sufficient quantities to provide adequate adhesion, for example, in amounts equal to or in excess of 1% of the combined amount of metal powder and inorganic binder, also known as the solids content of the metalizing composition. The metalizing compositions of this invention, in addition to being used to form conductors, can also be used with inorganic binders. A wide range of resistances can be obtained by varying the amount of inorganic binder within the range of 1–99% by weight of the solids content (e.g., metals, inorganic binder, etc.).

The present metalizing compositions can be printed and fired on various types of ceramic dielectrics including those composed of forsterite, steatite, titanium oxide, barium titanate, bismuth stannate, alumina or zircon porcelain. Any other conventional unfired (green) dielectrics or prefired dielectrics can be used.

The invention is further illustrated by the following additional examples. In the examples and elsewhere in the specification, all parts, ratios and percentages of materials or components are by weight.

Example 2

The gray platinum powder of Example 1 was dispersed in an inert vehicle consisting of 30% hydrogenated rosin, 6% ethyl cellulose, 2.5% beta-terpineol and 61.5% kerosene. The weight ratio of metal powder to vehicle was 60% metal and 40% vehicle. The metalizing composition was printed by screen stenciled techniques on a polymethyl methacrylate (PMA) resin bonded ceramic sheets. The sheets contained 10% PMA, 79.4% barium titanate and 10.6% bismuth stannate. After drying, ten printed sheets were stacked with alternate electrodes slightly offset and the edges were trimmed to expose alternate electrodes on opposite side of the stack. The stack was then fired over a period of several days, finally reaching a temperature of 1300° C. After firing, the stack was coated with a fired-on silver conductor on each end and refired to 760° C. Copper wires were then soldered to the silver and a measurement was made for capacitance and dissipation factor. For the particular size and pattern of the ceramic, the capacitance was 0.1 microfarads and the dissipation factor less than 1%. Of greater importance, there were no bubbles or blisters in the fired capacitor, nor was there any evidence of delamination when a cross-section of the unit was examined.

Example 3

A similar metalizing composition was prepared in accordance with Example 2 except that platinum "black" was used instead of the platinum which was prepared in Example 1. The platinum "black" had an average particle size of 0.01–0.1 micron. Some of the resulting capacitors showed evidence of blistering; others were severely cracked and delaminated. The intact units were measured for capacitance and dissipation; the results showed very wide scatter, but the capacitor did not have as large a capacitance or as low a dissipation factor as in Example 2.

Example 4

A metalizing composition in accordance with Example 2 was printed onto a single piece of unfired barium titanate and subsequently fired to 1300° C. over a period of eight hours. The resulting metal film was smooth, continuous and especially free of fissures. The electrical conductivity was less than 0.2 ohm/square.

Example 5

The above experiment was repeated using metalizing composition of Example 3. The resulting metal film was badly fissured, possessed a resistance ranging from 1–10 ohms/square and displayed discontinuity in some areas.

Example 6

A metal powder mixture comprising 60% of the gray platinum powder from Example 1 and 40% palladium (0.3 micron) was dispersed in an inert vehicle of 8% ethyl cellulose and 92% beta-terpineol. The weight ratio of metal powder to vehicle was 65% metal and 35% vehicle. This metalizing composition was screen printed onto ethyl cellulose bonded ceramic sheets. The sheets contained 10% ethyl cellulose and 90% barium titanate. After drying, 10 printed sheets were stacked with alternate electrodes slightly offset and the edges were trimmed to expose alternate electrodes on opposite sides of the stack. The stack was then fired over a period of several days, finally reaching a temperature of 1400° C. There were no bubbles or blisters in the fired capacitor nor was there any evidence of delamination when a cross-section of the unit was examined.

I claim:

1. In a metalizing composition comprising an inert liquid vehicle having dispersed therein a noble metal powder, the improvement comprising, as the noble metal powder, a platinum powder having an average particle size within the range of 0.5–2 microns, said powder having been produced by a process which comprises (1) preparing an aqueous platinum metal chloride solution, (2) precipitating platinum from solution as a platinum-ammonia complex by adding ammonium hydroxide to the solution until the pH of the solution is in the range of 9–11, and (3) reducing the platinum-ammonia complex by adding a reducing agent from the group consisting of monohydrazine sulfate, dihydrazine sulfate, hydrazine hydrochloride, hydrazine hydrate and mixtures thereof, to the complex to yield the platinum powder.

2. A metalizing composition in accordance with claim 1, which also contains finely divided metal(s) selected from the group consisting of palladium, gold, silver, ruthenium, osmium, rhodium, mercury, alloys thereof and mixtures thereof.

3. A metalizing composition in accordance with claim 1 which further comprises an inorganic binder wherein said binder is present in an amount within the range of 1–99% by weight, based on the solids content, of the metalizing composition.

4. A metalizing composition in accordance with claim 1, which further comprises an inorganic binder wherein said binder is present in an amount within the range of 1–99% by weight, based on the solids content, of the metalizing composition.

References Cited

UNITED STATES PATENTS

| | | | |
|---|---|---|---|
| 2,915,406 | 12/1959 | Rhoda et al. | 106—1 |
| 3,385,799 | 5/1968 | Hoffman | 106—1 |
| 3,390,981 | 7/1968 | Hoffman | 75—108 |
| 3,427,153 | 2/1969 | Jenkatesan | 75—108 |
| 3,440,062 | 4/1969 | Hoffman | 106—1 |
| 3,486,928 | 12/1969 | Rhoda et al. | 106—1 |
| 3,502,489 | 3/1970 | Cole | 106—1 |

LORENZO B. HAYES, Primary Examiner

U.S. Cl. X.R.

117—123 B, 227; 252—514